3,144,119
CONVEYOR SYSTEM
Biagio J. Nigrelli, Northbrook, Wendell E. Standley, Lake Forest, and Richard B. Wittmann, Chicago, Ill., assignors, by mesne assignments, to Johns-Nigrelli-Johns, Inc., Skokie, Ill., a corporation of Illinois
Filed Dec. 15, 1961, Ser. No. 159,576
2 Claims. (Cl. 198—32)

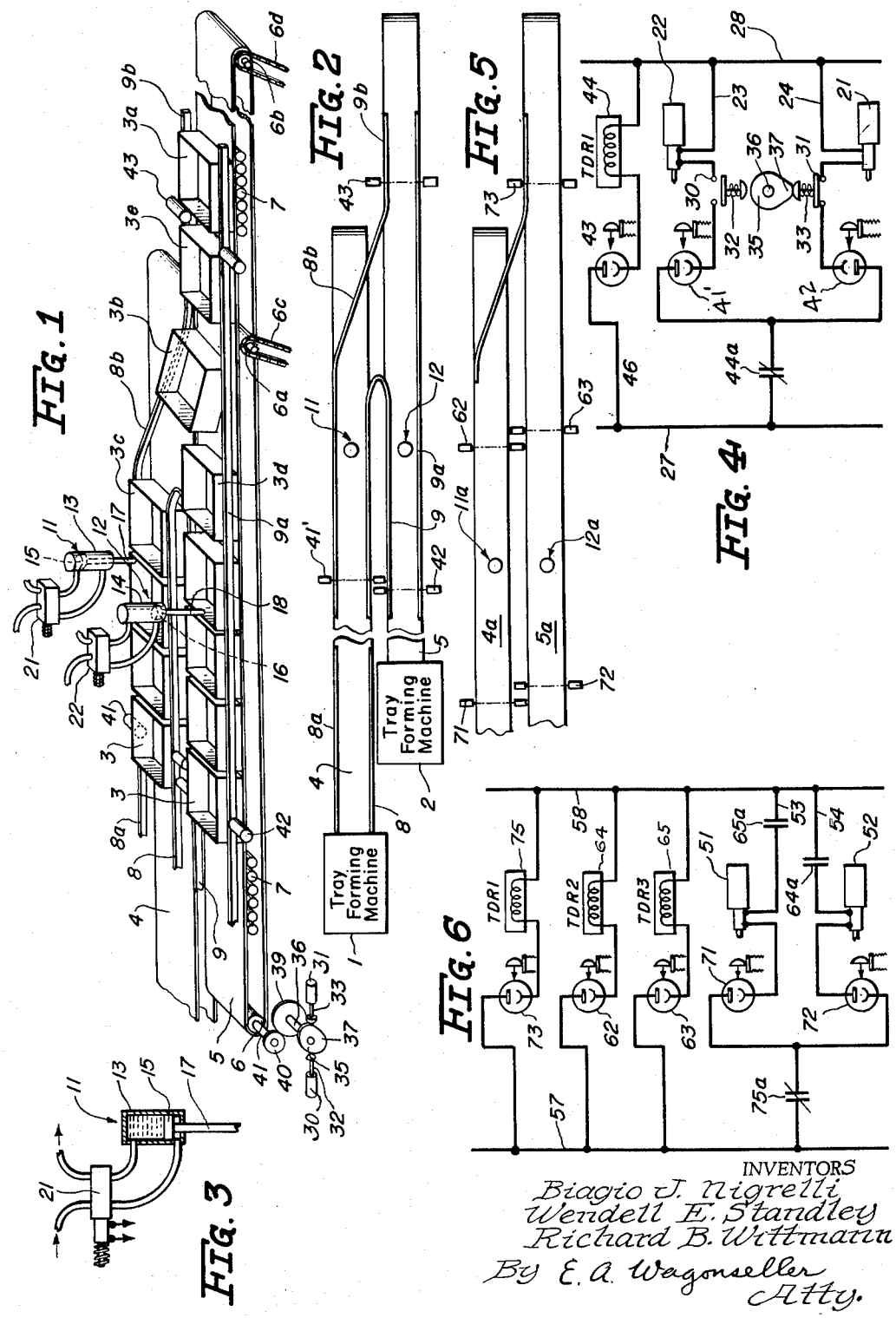

The present invention relates to conveying systems and methods of arranging articles on a conveyor, and more particularly to an arrangement of conveyors and controlling means for the articles being conveyed to cause two rows of conveyed articles to be converted readily into a single row.

As herein disclosed, the invention is especially designed to handle empty, open top cases or trays, or similar open top articles, and has for its principal object to provide simple and economical mechanism whereby two conveyed rows of trays, as they are formed by independent tray forming machines, will be held on individual conveyors and single trays in each row will be released in alternating relation so that such released trays will move in a single line to tray loading stations. It is also an object of the invention to provide a novel method to effect the combination of two separate rows of open top trays into a single line of trays.

Another object of the invention is to provide, in a mechanism of the type referred to, individually operating control means whereby temporary discontinuance of the flow of trays on one of the feeding conveyors may occur without affecting the operaton of the other conveyor, and the flow of trays on the conveyor temporarily out of operation will be resumed in accurate timed relation with the delivery of trays from the conveyor that has continued to operate—all without manual intervention. Additional and more specific objects and advantages of the present invention will become apparent as the description proceeds.

In the drawings—

FIG. 1 is a schematic perspective view showing a pair of conveyors upon which rows of newly formed trays are deposited and showing vertically movable retaining pins acting alternately upon the leading tray of each row to release the trays in spaced relation and form them into a single line;

FIG. 2 is a schematic plan view of the conveyors located side by side and arranged to receive trays from tray forming machines;

FIG. 3 is a schematic detail view of one of the cylinder and piston mechanisms with its solenoid valve control;

FIG. 4 is a wiring diagram for the mechanism illustrated in FIGS. 1 and 2;

FIG. 5 is a schematic plan view of a modified form of the conveyor system; and

FIG. 6 is a wiring diagram for the modified form.

The invention contemplates a novel method of arranging uniform sized trays in a single, conveyed row which comprises alternately moving single trays from two abutted rows toward and into a common delivery path by placing or arranging the abutted rows on continuously operating conveying means. Each row of trays is restrained from advancing by movable holding elements which engage the leading tray of each row. The leading tray of one row is first released by moving a holding element out of engagement with such leading tray and then returning the holding element to holding position to engage the next following tray, which then becomes the leading tray of the abutted row. After the released tray has travelled toward the common delivery path a distance in excess of a tray length, in usual cases about one and one-half times the tray length, the holding element engaging the leading tray on the other conveying means is likewise moved to released position and, after a brief interval, returned to engaging relation with the next following tray. This holding element then, in turn, is held in tray engaging condition until the released tray on the other conveying means has travelled a distance in excess of a tray length, and thus the operation is continued. The released trays from one row are diverted from their original path and moved in between the spaced trays released from the other row. The single row of trays is then conveyed to a desired discharge point.

The mechanism employed, as herein disclosed, comprises two continuously operating belt conveyors upon which separate lines of newly formed trays are placed as they are produced by tray forming machines. The trays on each conveyor are advanced in abutted relation. Above each conveyor is arranged a vertically movable stop-rod or pin, each operated by suitable piston and cylinder mechanism. The lower free ends of the pins extend into the trays when in their lowered position to engage the trailing end wall of the leading tray in each row of abutted trays. While a row of trays is being held by the pin in lowered position the conveyor belt slips beneath the trays. As each pin is raised or retracted the leading tray will be released and this will allow the abutted row of trays to advance. After each lifting or retraction of the pin it is moved promptly back to its lowered position in which position it will extend into the next succeeding tray which will then move forward until its trailing wall comes into contact with the lowered pin. Control mechanism is provided so that the pins will be raised and lowered alternately. The timing of the action of the pins is so related to the conveyor speed that a tray released on one conveyor will advance a distance in excess of one tray length before the tray on the other conveyor is released. One of the conveyors is of sufficient length to carry the trays to the desired destination. The other conveyor is located along the side of the first conveyor and is provided with a deflector member in the form of a diagonally disposed rail extending across such conveyor to deflect or switch the tray onto the first conveyor.

Referring more particularly to the drawings, conventional tray forming machines 1 and 2 are arranged to deposit newly formed trays 3, 3 upon continuously operating conveyors 4 and 5. As herein illustrated, the conveyors comprise suitable endless belts which will readily advance the trays but, when the trays are held stationary, the belts will slip beneath the trays without excessive friction. The belts pass over suitable end rolls indicated at 6, 6a and 6b, and are driven, as herein indicated by drive chains 6c and 6d running over sprockets held on the shafts of rolls 6a and 6b. Intermediate their ends the conveyor belts may be supported on a number of small diameter idler rolls, such as indicated at 7, 7. The belts may be supported intermediate their ends in any other desired manner.

The belts 4 and 5 are provided with side rails 8, 8a and 9, 9a extending forwardly of the forming machines to guide the trays as they travel on the belts. The belt 4 is preferably shorter than belt 5 and has its discharge end located just beyond the point where the trays are transferred onto belt 5. The outer guide rail 8a is connected with a section 8b, arranged at an angle across belt 4 and joined with a straight section 9b, extending along belt 5. The inner rail sections 8 and 9 located along adjacent edges of the belts 4 and 5 may be joined together just short of the path of the trays moving at an angle off belt 4. Beyond the angular section 8b of the guide rail the rails 9a and 9b extend whatever distance is desired or convenient. If desired, three belts may be employed and trays from the outside belts are diverted to the middle belt.

The conveyor belt 4 is preferably disposed slightly above the level of belt 5 so that, when trays on belt 4 move against the angular guide section 8b, they will be transferred onto belt 5 with no difficulty.

Centrally above each belt 4 and 5 are suitably supported piston and cylinder mechanisms, indicated as a whole at 11 and 12. These may be identical, if desired, and comprise suitable cylinders 13 and 14, with pistons and piston rods, 15, 16 and 17, 18. The piston rods hereinafter will generally be referred to as pins. These pins 17 and 18, as shown, are arranged to move vertically, and the location of the cylinders above the conveyors is such that the lower or free ends of the pins will extend somewhat below the level of the upper edges of the tray walls so as to be effective in holding a row of trays urged forward by the traveling belt.

The pistons are operated by compressed air admitted through solenoid valves 21 and 22. Each valve is arranged to admit air below the piston to raise the pin out of contact with the rear or trailing wall of the leading tray in the row to allow the row of trays to advance. After a brief interval the position of the valve is reversed to admit air above the piston and return the pin to its lowered position. Accuracy of operation is not essential as the pin is lowered after the leading wall of the next following tray clears the pin, but this tray will not be stopped until the rear wall of the tray comes into contact with the lowered pin. While various specific types of solenoid valves can be employed, in the present instance these valves are of the single-acting, spring-return, four-way type.

Means are provided for alternately actuating the solenoid valves and for controlling their operation so that the released trays on each conveyor will travel a distance in excess of a tray length before the tray on the adjoining conveyor is released. This will allow room for the trays coming from conveyor 4 to move in between the spaced trays on conveyor 5. The particular spacing of the trays as they are released on each conveyor may be varied but, in practice, a spacing between the trays of one and one-half times the tray length is adequate. If more than two conveyors are employed and it is desired to bring trays from these conveyors all into a single line on one of the conveyors, the spacing between released trays and the next following tray on a given conveyor would be appropriately increased.

Referring to the wiring diagram (FIG. 4) the solenoids of valves 21 and 22 are connected by conductors 23 and 24 to power supply lines 27 and 28. The circuits to the solenoids are controlled by individual switches 30 and 31 which are provided with spring loaded operating rods 32 and 33 respectively, normally urged toward open position. A rotatable cam member 35, fixed on a shaft 36 (see FIG. 1) has an actuating section 37 which is arranged to contact the switch rods periodically as the cam rotates. The cam shaft 36 has a gear 39 meshing with a smaller gear 40, fixed on shaft 41 of end roll 6 over which the conveyor belt 5 passes. The gear ratio is such that the cam will be caused to engage each switch rod to close the switch and actuate its solenoid valve while the released trays on the respective conveyor belts travel a distance well in excess of a tray length. If a different gear ratio is desired it is a relatively simple matter to substitute new gears 39 and 40 to effect the necessary change in the spacing of the released trays. Thus, when switch 31 is actuated to close the circuit to the solenoid of valve 21, the pin 17 will be lifted to release the leading tray on conveyor 4. While the released tray is traveling its required distance of over its length, the cam section 37 will have moved into position to engage switch rod 32 and close switch 30. This will cause pin 18 to be lifted to release the leading tray on conveyor 5. As above stated, the solenoid valves operate to raise the tray-holding pins and hold them in raised position for only a short interval so that only a single tray is released with each switch actuation.

Photocell switch units 41′ and 42 are located at the sides of conveyors 4 and 5 at a suitable distance rearwardly of the tray-holding pins to detect breaks in the uniform flow of trays from the forming machines. The normal operation is such that there will be a number of trays on each conveyor abutted end to end which will pass the photocells and constantly keep the light beams interrupted. The establishment of the beam in either photocell unit, due to the lack of sufficient trays, will open the circuit to the solenoid valve with which the photocell switch unit is connected and render the solenoid valve in that circuit inoperative with the consequence that the tray-holding pin controlled by that circuit will remain in lowered position. As soon as the beam to the photocell is again interrupted the switch controlled by the photocell will close and the next passage of the cam section 37 past the switch for the temporarily inactive circuit will close the circuit and operate the solenoid switch to release the leading tray.

For the purpose of preventing trays from jamming and backing into the tray holding pins 17 and 18, an additional photocell switch unit 43 is located at the side of conveyor 5 a short distance downstream from the deflector rail 8b. In conjunction with the photocell unit 43 there is employed a time delay relay 44 which is maintained with its contacts 44a normally closed by a coil energized through the photocell and conductor 46. The contacts remain closed so long as light is on the receiver of the photocell and will open after the light beam is interrupted for longer than a predetermined time interval. This interval is slightly longer than the time required in normal operation for a single tray to pass through the light beam.

As indicated in FIG. 4, the relay contacts 44a will be opened when the relay coil becomes energized by the photocell switch after the required interval following interruption of the light beam. The opening of the relay contacts opens both of the circuits to the solenoids 21 and 22 controlling operation of pins 17 and 18, rendering them inoperative and stopping the release of further trays since both pins will remain in their lowered position.

The relay contacts 44a will thus remain open until the jam in the trays downstream from photocell 43 has been corrected and the trays begin to move past the photocell in spaced relation. As soon as the light beam is reestablished on the receiver of the photocell unit the relay contacts 44a will close and thus reactivate the circuits for the solenoids 21 and 22. Thus, upon the next contact made by section 37 of the cam 35 with one of the switch rods the appropriate pin 17 or 18 will be lifted momentarily to release its tray for advancing on its continuously moving conveyor.

Referring to the modified form of the invention, illustrated in FIGS. 5 and 6, the cam operated switches are eliminated and each tray as released actuates mechanism for releasing the next leading tray on the other conveyor.

The arrangement of conveyors and retractible pins is the same as in the first form and the solenoid valves 51 and 52 for the control of the operation of the cylinder and piston mechanisms 11a and 12a are the same as in the first form. The solenoid valves 51 and 52 are connected by conductors 53 and 54, and through the switches of photocell units 71 and 72 to power supply lines 57 and 58. The photocell units 71 and 72 operate exactly as units 41′ and 42 of the first form.

The solenoids are controlled by time delay relays 64 and 65, having normally open contacts, indicated at 64a and 65a. The coils of the relays are energized through circuits including photocell units 62 and 63 and the respective conductors 66 and 67.

When a tray is released on continuously moving conveyor 4a by the operating mechanism 11a, it advances through the beam of photocell 62, and the coil of relay 64 after a brief interval will be energized to cause its contact 64a to close. This actuates the solenoid valve 52 for cylinder 12a and causes the pin to lift which holds the leading tray on continuously moving conveyor 5a. This tray then advances through the beam of photocell 63, and the coil of relay 65, after a brief interval, will be energized causing its contacts 65a to close, and this will actuate solenoid 51 to release the next leading tray on conveyor 4a. The operation under normal conditions will then continue, with each released tray operating controls to release the leading tray on the opposite conveyor.

Photocell unit 73 and time delay relay 75, 75a of this form operate the same as the photocell unit 43 and time delay relay 44, 44a of the first form.

In each form of the invention the time delay mechanism is selected or adjusted to conform to the conveyor speed so that, in the handling of uniform sized trays, a tray released on one of the conveyors will travel a distance in excess of its length before a tray on the other conveyor is released. Thus, when the two rows of conveyed trays are combined, they will be brought into a single row with spaces between so that there is no tendency for the trays to collide and fail to combine successfully.

FIG. 1 shows the system after it has been placed in normal operation. The trays indicated at 3a and 3b have been delivered onto belt 5 from belt 4, and tray 3c has just been released and is ready to advance with the entire group of abutted trays following the released tray. The actuating cam section 37, as shown in FIGS. 1 and 4, has just contacted the switch rod 33 of switch 31 to actuate solenoid valve 21, and this has caused pin 17 to be lifted out of contact with the inside surface of the trailing wall of tray 3c. On conveyor belt 5 the tray 3d has traveled the desired distance, indicated as approximately one and one-half tray lengths. Thus, tray 3c, which is ready to advance as shown in FIG. 1, will maintain a distance of approximately one-fourth a tray length between its leading wall and the trailing wall of tray 3d. As tray 3c moves against the guide rail 8b it will be deflected onto belt 5 and will move in behind tray 3d, still maintaining the approximate spacing of one-fourth a tray length behind tray 3d. As soon as tray 3c has advanced a very short distance the pin 17 will be returned to lowered position and its end will then enter behind the front wall of the succeeding tray and remain in lowered position where it will be contacted by the trailing wall of this tray, holding such tray and all the following abutted trays until the pin is again lifted.

Referring to the alternate form of control, as shown in FIGS. 5 and 6, after a group of abutted trays has been accumulated on each conveyor so that the switches of the photocell units 71 and 72 will be held closed, and the leading tray of each group is held by a pin, one of the photocell units will be actuated manually to release a tray on the opposite conveyor, or a tray can be manually released on one of the conveyors to move through the photocell beam and release a tray on the opposite conveyor. As above explained, the photocell switch 73 will close and energize the coil of relay 75 as soon as the current is turned on and will maintain the circuits to the solenoid valves operative so long as no jam in the flow of trays develops on the combining section of conveyor 5.

It is apparent from the foregoing that the present invention provides a relatively simple and convenient method and apparatus for continuously converting two rows of trays into a single conveyed row. The invention is particularly advantageous for use with tray forming or setting up machines which have a limited speed of production, requiring more than one forming machine for a tray filling line.

While the present description sets forth preferred forms of the invention, numerous changes may be made in the mechanism as disclosed without departing from the spirit of the invention, and it is therefore desired that the present disclosure be considered in all respects as illustrative and not restrictive, reference being had to the appended claims rather than to the foregoing description to indicate the scope of the invention.

We claim:

1. A conveyor system for converting two rows of conveyed, open-top trays of uniform size to a single row, comprising, in combination, first and second conveyors, means for continuously operating the conveyors at uniform speed, transfer means for delivering trays from one conveyor to the other, movable stop-pins arranged in operative relation to each conveyor whereby a free end of each pin is arranged to enter open top trays on each conveyor and receive contact by the trailing wall of a tray to restrain its forward movement on the conveyor, individual operating means for moving each pin to take its free end out of tray holding position and release a tray for advancement upon its conveyor, control means for each of such pin operating means, including first and second solenoid valves of the type which, when energized, will assume a condition to effect retraction of the pin which it controls and thereafter will assume its original condition to effect the return of the pin to tray-wall engaging position, a conducting circuit for connecting the solenoid of each solenoid valve to a source of electric current, first and second photocell units arranged respectively at the sides of the first and second conveyors at locations upstream from the transfer means and in positions where trays passing along the conveyors will interrupt the light beams of the photocells, each photocell unit including a switch, the switch to the first unit being included in the circuit of the second solenoid and the switch to the second unit being included in the circuit to the first solenoid, means included in each photocell unit for closing its switch after a predetermined time delay following interruption of its beam, whereby a tray moving past the first photocell unit on the first conveyor to interrupt its light beam will effect the release of a tray on the second conveyor and the released tray on the second conveyor in moving past the second photocell will release a tray on the first conveyor.

2. A conveyor system for converting two rows of conveyed, abutted articles to a single row, comprising, in combination, first and second conveyor sections, means for continuously operating the conveyor sections, said sections being operatively combined with a third section to receive articles discharged alternately from the first two sections, movable stop means for the first and second sections for arresting the leading article of each row of articles on such sections, individual operating means for moving such stop means into and out of article-holding position, individual, electrically actuated control means for each operating means, a conducting circuit for each control means, first and second photocell units operatively arranged respectively along the first and second conveyor sections in positions where passing articles will interrupt their light beams, each photocell unit including a switch, the switch for the first unit being included in the circuit of the stop control means for the second conveyor section, and the switch for the second unit being included in the circuit of the stop control means for the first conveyor section, means included in each photocell unit for closing its switch after a predetermined time delay following interruption of its light beam, whereby an article moving past the first photocell unit on the first conveyor section to interrupt its light beam will effect the release of an article on the second conveyor section, and a released article on the second conveyor section, in moving past the second photocell unit, will effect the release of an article on the first conveyor section.

References Cited in the file of this patent

UNITED STATES PATENTS

| | | |
|---|---|---|
| 1,010,828 | Vaughan | Dec. 5, 1911 |
| 2,295,232 | Mitchell | Sept. 8, 1942 |
| 2,860,762 | Alexander | Nov. 18, 1958 |
| 2,978,092 | Phillips | Apr. 4, 1961 |
| 3,063,544 | Yen | Nov. 13, 1962 |